United States Patent Office 3,558,621
Patented Jan. 26, 1971

3,558,621
ANTHRAQUINONE REACTIVE DYESTUFFS
Hans-Samuel Bien, Burscheid, Erich Klauke, Odenthal-Hahnenberg, and Klaus Wunderlich, Leverkusen, Germany, assignors to Farbenfabriken Bayer Aktiengesellschaft, Leverkusen, Germany, a corporation of Germany
No Drawing. Filed May 24, 1968, Ser. No. 731,712
Claims priority, application Germany, June 2, 1967, F 52,582
Int. Cl. C07d 55/46
U.S. Cl. 260—249                                    13 Claims

ABSTRACT OF THE DISCLOSURE

Anthraquinone reactive dyestuffs useful in dyeing hydroxyl and nitrogen-containing textiles having a nucleus consisting of a 1-amino-2-sulfo-4-(substituted or unsubstituted) 4'-amino or alkyleneamino, triazinyl (sulfonanalino) anthraquinone. The dyestuffs show improved fastness properties.

---

The invention relates to anthraquinone reactive dyestuffs of the formula

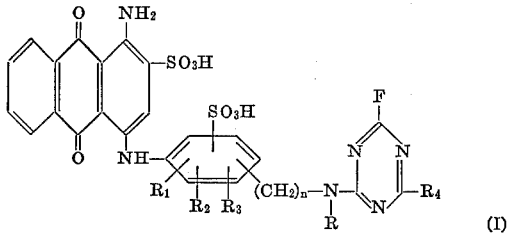

(I)

in this formula, the radicals $R_1$, $R_2$ and $R_3$ represent, independently of one another, hydrogen or alkyl, alkoxy or halogen substituents, R stands for hydrogen or a substituent, $n$ denotes the number 0, 1 or 2. F stands for a fluorine substituent, and $R_4$ stands for an amino or hydrazino group or for a hydrocarbon radical which may be linked via O, N or S and which may be further substituted.

Preferred radicals $R_1$ to $R_3$ are lower alkyl groups, such as methyl and ethyl; lower alkoxy groups, such as methoxy; halogen substituents, such as Cl, Br and F; R is preferably hydrogen or a lower alkyl group, such as methyl and ethyl; substituents $R_4$ are, for example, hydrocarbon radicals, such as lower alkyl groups, e.g., methyl, ethyl, propyl; aryl radicals, such as phenyl or substituted phenyl radicals, e.g., chlorophenyl, methylphenyl, nitrophenyl and sulphophenyl radicals; $NH_2$ and substituted amino groups, for example, mono- or dialkylamino radicals, —NHCH$_3$, —N(CH$_3$)$_2$, —NHC$_2$H$_5$, —N(C$_2$H$_5$)$_2$, —NHC$_3$H$_7$, —NH—C$_4$H$_9$; arylamino groups, such as phenylamino groups and substituted phenylamino groups, e.g., o-, m-, or p-sulphophenylamino, 2,4-, 2,5- and 3,5-disulphophenylamino, o-, m- or p-chlorophenylamino, o-, m- or p-methylphenylamino groups, ether and thioether groups, such as methoxy, ethoxy, propoxy, phenoxy and substituted phenoxy radicals, methylthio, ethylthio and phenylthio groups as well as substituted phenylthio groups.

Suitable fluoro-triazine radicals

(II)

are, for example, 2-fluoro-4-amino-6-triazinyl, 2-fluoro-4-methylamino - 6 - triazinyl, 2 - fluoro - 4-phenylamino-6-triazinyl, 2-fluoro-4-(o-, m- or p-sulphophenyl)-amino-6-triazinyl, 2-fluoro-4-(2,4- or 2,5- or 3,5- or 4,5-disulphophenyl) - amino-6-triazinyl, 2-fluoro-4-dimethylamino-6-triazinyl, 2 - fluoro - 4-methoxy-6-triazinyl, 2-fluoro-4-(β-methoxy - ethoxy) - 6-triazinyl, 2-fluoro-4-hydrazino-6-triazinyl, 2-fluoro-4-phenoxy-6-triazinyl, 2-fluoro-4-(2-, 3- or 4-sulphophenoxy)-6-triazinyl, 2-fluoro-4-benzyloxy-6-triazinyl, 2 - fluoro - 4-(β-hydroxyethoxy)-6-triazinyl, 2-fluoro - 4-(β-hydroxyethylmercapto)-6-triazinyl, 2-fluoro-4 - methyl - 6 - triazinyl, 2-fluoro-4-phenyl-6-triazinyl, 2-fluoro-4-(2'-, 3'- or 4'-sulphophenyl)-6-triazinyl, 2-fluoro-4 - diethylamino - 6 - triazinyl, 2-fluoro-4-(β-bisoxethylamino)-6-triazinyl, 2-fluoro-4-methylmercapto-6-triazinyl, 2-fluoro-4-phenylmercapto-6-triazinyl, 2-fluoro-4-(2'-, 3'- or 4'-chlorophenylmercapto)-6-triazinyl or 2-fluoro-4-(2'-, 3'- or 4'-sulphophenylmercapto)-6-triazinyl.

The new dyestuffs are obtained by reacting aminoanthraquinone compounds of the formula

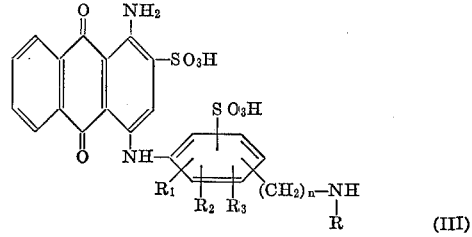

(III)

in which R, $R_1$, $R_2$, $R_3$ and $n$ have the same meaning as above, with fluorotriazine compounds of the formula

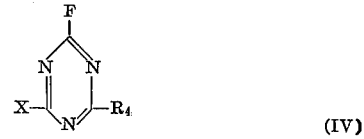

(IV)

in which R and F have the same meaning as above, and X stands for an anionically splittable radical.

The fluorine substituent has a preferred interest among the reactive substituents X which can be split off as anionic radicals. Further anienically splittable radicals which are suitable as and when the case may arise, are quaternary ammonium groups, such as $$-\overset{+}{N}(CH_3)_3 \text{ and } -\overset{+}{N}(C_2H_5)_3$$

for example.

According to another method of production, some of the new dyestuffs are also obtained in such a manner that anthraquinone dyestuffs of the formula

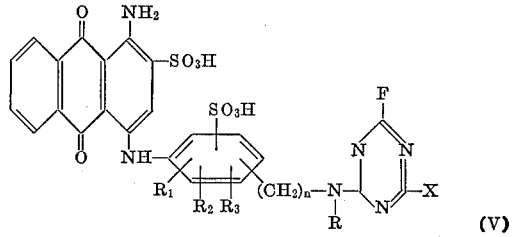

(V)

in which R to $R_3$, $n$, X and F have the same meaning as above, are condensed with ammonia or amino, hydroxy or thio compounds which contain a reactive hydrogen atom, while splitting off HX. In this way, those products of the Formula I are obtained in which $R_4$ stands for an amino group or for a substituted amino group, or for a hydroxy ether or thio ether grouping.

Triazine compounds suitable for the above-mentioned reactions are the following, for example:
2,4,6-sym.-trifluorotriazine, 2,4-difluoro-6-amino-sym.-triazine, 2,4-difluoro-6-methylamino-sym.-triazine, 2,4-difluoro - 6-ethylamino-sym.-triazine, 2,4-difluoro-6-phenylamino-sym.-triazine, 2,4 - difluoro - 6 - (2'- or 4'- or 6'-sulphophenyl)-amino-sym.-triazine, 2,4-difluoro-6-(2,4- or 3,4- or 2,5- or 4,5-disulphophenyl)-amino-sym.-triazine, 2,6 - difluoro - 4-dimethylamino-triazine, 2,6-difluoro-4-methoxy-triazine, 2,6-difluoro-4-(β-methoxy-ethoxy)-triazine, 2,6 - difluoro - 4-hydrazino-triazine, 2,6-difluoro-4-phenoxy - triazine, 2,6 - difluoro - 4(2-, 3- or 4-sulphophenoxy-)-triazine, 2,6-difluoro-4-benzyloxy-triazine, 2,6-difluoro - 4 - (β-hydroxyethoxy)-triazine, 2,6-difluoro-4-β-hydroxyethylmercapto-triazine, 2,6-difluoro-4-methyl-triazine, 2,6-difluoro-4-phenyl-triazine, 2,6-difluoro-4-(2-, 3- or 4-sulphophenyl)-triazine, 2,6-difluoro-4-ethylmercapto-triazine, 2,6-difluoro-4-(β-bis-oxethylamino)-triazine, 2,6-difluoro-4-methylmercapto-triazine, 2,6-difluoro-4-phenylmercapto-triazine, 2,6-difluoro-4-(2-, 3- or 4-chlorophenylmercapto)-triazine or 2,6-difluoro-4-(2-, 3- or 4-sulphophenylmercapto)-triazine.

The above-mentioned and further fluorotriazine compounds which can be used according to the invention can, in general, readily be obtained by reacting the appropriate chlorine or bromine compounds with alkali metal fluorides, e.g., with potassium fluoride, $NaHF_2$, $KSO_2F$, $SOF_3$ and $AgF_2$, or by reacting appropriate OH compounds with $SF_4$, $COF_2$, $COClF$ or cyanofluoride, or by heating appropriate diazonium tetrafluoborates.

The reaction of the amino-anthraquinone dyestuffs (III) with the fluorotriazine compounds (IV) or the reaction of dyestuffs of the Formula V with amino, hydroxy or thio compounds is carried out, dependent upon the type of the starting compounds used, in an organic, organic-aqueous or aqueous medium at temperatures ranging from —10° C. to 100° C., preferably from 0° C. to 50° C., in the presence of alkaline condensing agents, such as aqueous alkali metal carbonate or alkali metal hydroxide solutions.

A further modification for the preparation of the new dyestuffs of the Formula I, which may be applied in some cases, consists in that in anthraquinone dyestuffs of the formula

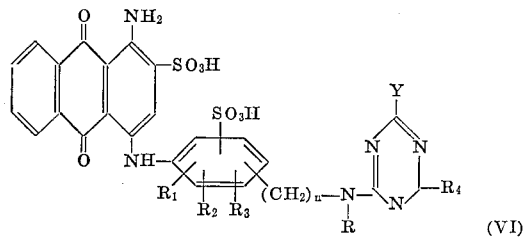

in which R to $R_4$ and $n$ have the same meaning as above, and

Y stands for an anionically splittable radical with the exception of a fluorine substituent, the radical Y is exchanged in known manner for a fluorine substituent. The exchange of the radical Y, e.g., of the chlorine or bromine atoms for a fluorine substituent can be carried out in the manner already described.

The new dyestuffs are extremely valuable products which are suitable for the most varied purposes of application. In the form of water-soluble compounds, they have a preferred importance for the dyeing of hydroxyl group-containing and nitrogen-containing textile materials, in particular of textile materials of natural and regenerated cellulose, as well as of wool, silk, synthetic polyamide and polyurethane fibres. Due to the reactive fluorine substituents in the trazine ring, the products are especially well suited as reactive dyestuffs for the dyeing of cellulose materials according to the methods which have recently become known for this purpose. The fastness properties obtained are excellent, in particular the fastness to wet processing.

For the dyeing of cellulose, the dyestuffs are preferably used in an aqueous solution which can be mixed with alkaline reacting substances, such as alkali metal hydroxide or alkali metal carbonate, or with compounds which are converted into alkaline reacting substances, such as alkali metal bicarbonate, $Cl_3C$—COONa. Further auxiliary agents may be added to the solution, which, however, should not react with the dyestuffs in an undesirable manner. Such additives are, for example, surface-active substances, such as alkyl sulphate, or materials preventing the migration of the dyestuff, or dyeing auxiliary products, such as urea, or inert thickening agents, such as oil-in-water emulsions, tragacanth, starch, alginate or methyl cellulose.

The solutions or pastes thus prepared are applied to the material to be dyed, for example, by padding on the foulard (short bath) or by printing, followed by heating for some time at an elevated temperature, preferably at 40 to 150°. Heating may be carried out in the hotflue, in a steam apparatus, on heated rollers, or by the introduction into heated concentrated salt baths either by itself or alone successively in any desired sequence.

When a padding or dyeing liquor without alkali is used, a passage of the dry material is subsequently carried out through an alkaline-reacting solution to which sodium chloride or Glauber salt is added. The salt addition thus reduces the migration of the dyestuff from the fibre.

It is also possible to pretreat the material to be dyed with one of the afore-mentioned agents, subsequently treating it with the solution or paste of the dyestuff and, finally, as stated, fixing it at an elevated temperature.

When dyeing is carried out from a long bath, the material is introduced into an aqueous solution of the dyestuff (goods-to-liquor ratio 1:5 to 1:40) at room temperature and dyed for 40 to 90 minutes, while optionally raising the temperature up to 20 to 60° C., with the portionwise addition of salt, e.g., sodium sulphate, and subsequently of alkali, for example, sodium phosphates, sodium carbonate, NaOH or KOH.

In this way, a chemical reaction between the dyestuff and the fibre takes place. When the chemical fixation is completed, the dyed material is rinsed hot and finally soaped, nonfixed residues of the dyestuff thus being removed. Eminently fast dyeings, which are especially fast to wet processing and light, are obtained.

In the so-called cold-batch-padding process a subsequent heating of the padded fabric may be omitted by storing the fabric for some time, e.g., 2 to 20 hours, at room temperature. A stronger alkali is used in this process than that which has been used in the dyeing process from a long bath described above.

For printing materials containing hydroxyl groups, a printing paste is used consisting of the dyestuff solution, a thickening agent, such as sodium alginate, and a compound of alkaline reaction or splitting off alkali upon heating, such as sodium carbonate, sodium phosphate, potassium carbonate, potassium acetate or sodium and potassium hydrogen carbonate., and the printed material is rinsed and soaped.

Textile materials containing amide groups, such as wool, silk, synthetic polyamide and polyurethane fibres, are generally dyed in the acidic to neutral range according to the dyeing methods customary for this purpose, a final increase of the pH value of the dyebath, e.g., to pH 7 to pH 9, sometimes being of advantage.

The dyestuffs are applied, for example, to wool and silk in the form of solutions, and to synthetic polyamide fabrics in the form of solutions or, preferably, in a dispersed form followed by an aftertreatment, optionally together with acid-binding agents (preferably in small amounts), such as sodium carbonate. Particularly favourable results were obtained on synthetic superpolyamides with those dyestuffs which are insoluble or only sparingly soluble in water. These are worked up by conventional methods and with the addition of the known auxiliary agents into a dyestuff dispersion and used as such in the dye- and/or padding bath or in a printing paste. Auxiliary agents suitable for being used in this way are, inter alia, compounds which prevent the dyestuff to migrate from the fibre, such as cellulose ethers, alkali metal chlorides and sulphates, wetting agents, such as condensation products from ethylene oxide and fatty alcohols of phenols, sulphonated fatty alcohols; solvents, such as thiodiglycol; as well as thickening agents, such as starch, tragacanth, alginate thickening, gum arabic etc.

The aftertreatment of the dyeings, impregnations and printings obtained on polyamide fibre fabrics is preferably carried out at a temperature of 50 to 110° C. and for a period of time of 5 to 60 minutes.

The dyeings obtainable with the new dyestuffs are generally distinguished by good to very good fastness properties, especially by an excellent fastness to wet processing.

The parts in the following examples are parts by weight.

EXAMPLE 1

10.4 parts 1-amino-4-(4′-methylamino-methylanilino) anthraquinone - 2,2′ - disulphonic acid, dissolved in 210 parts of water, are acylated at 0–5° C. and at a pH of 5.5 to 6 with 5 parts 2 - β-methoxy-ethoxy-4,6-difluoro-triazine-1,3,5. The pH value is maintained with a 2 N sodium hydroxide solution. The reaction mixture is poured into 400 parts of a saturated common salt solution, the product is filtered off with suction and washed with a saturated common salt solution. The resultant dyestuff

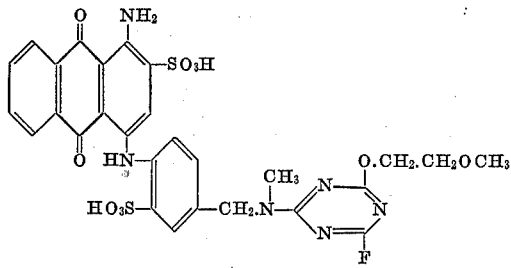

is dried at 40° C. in a vacuum. It dyes cotton in clear blue shades fast to wet processing.

EXAMPLE 2

10.6 parts 1-amino-4-(2′,6′-dimethyl - 3′ - aminomethylanilino)-anthraquinone - 2,5′ - disulphonic acid are dissolved in 110 parts of water. The solution is acylated at temperatures of 10 to 20° C. and at a pH value of 6 to 6.5 with 5 parts 2,4-difluoro-6-methoxytriazine. The hydrogen fluoride formed is buffered with a 2N sodium carbonate solution. When the reaction is completed, the product is salted out with 20 g. of common salt, filtered off with suction and washed with a 10% common salt solution. The resultant dyestuff

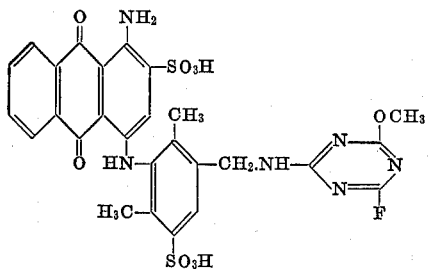

dyes wool in clear, reddish blue shades fast to wet processing.

In an analogous manner, valuable further reactive dyestuffs can be produced from the components set out in the following table, which dye wool and cotton in the specified shades:

| Dyeing compound | Reactive component | Shade |
|---|---|---|
| 1-amino-4-(2′-methyl-3′-amino-anilino)-anthraquinone-2,5′-disulphonic acid. | 2,4-difluoro-6-diethylaminotriazine | Blue. |
| 1-amino-4-(3′-amino-anilino)-anthraquinone-2-sulphonic acid. | 2,4-difluoro-6-(4′-sulpho-anilino)-triazine | Do. |
| 1-amino-4-(4′-amino-anilino)-anthraquinone-2-sulphonic acid. | 2,4-difluoro-6-(3′-sulpho-anilino)-triazine | Green-blue. |
| 1-amino-4-(4′-amino-anilino)-anthraquinone-2,2′-disulphonic acid. | 2,4-difluoro-6-methyl-mercapto-triazine | Greenish-blue. |

When cellulose fabrics are printed with a printing paste which contains, per kilogram, 15-gram of the dyestuff of the formula of this example, 100 g. urea, 300 ml. water, 500 g. alginate thickening (60 g. sodium alginate per kg. thickening) and 20 g. sodium carbonate, and which was made up with water to 1 kilogram, the fabrics are dried, steamed at 100° C. for 2 minutes, rinsed with hot water and soaped at the boil, an intense reddish blue print of good fastness to washing and light is obtained.

100 parts by weight of a cotton fabric are padded on the foulard at room temperature with an aqueous solution which contains 2% of the dyestuff of the formula of this example, 15 g./litre sodium hydrogen carbonate and 150 g./litre urea, the fabric is intermediately dried, heated at 140° C. for 30 seconds, then rinsed and soaped at the boil. The fabric is dyed in very clear, reddish blue shades which are fast to wet processing.

50 g. of a cotton hank are dyed in 1 litre of a dyeing liquor which contains 1.5 g. of the dyestuff of the formula of this example, by adding at 20 to 30° C., within 30 minutes, 50 g. of common salt in several portions, followed by the addition of 20 g. sodium carbonate and treatment at the same temperature. After rinsing, soaping at the boil and drying, a reddish blue dyeing of good fastness to wet processing, rubbing and light is obtained.

EXAMPLE 3

4.9 parts of 1-amino-4-(4′-amino-anilino)-anthraquinone-2,2′-disulphonic acid are dissolved in 200 parts of water and acylated with 2.3 parts of 2-anilino-4,6-difluoro-triazine at 20° C. and a pH of 5 to 6 with the addition of 1.5 parts of chlorobenzene. The dyestuffs of the formula

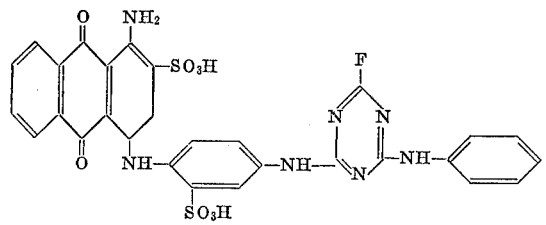

is precipitated in form of its sodium salt by the slow addition of sodium chloride, it is filtered off with suction, washed with a 5 percent sodium chloride solution and dried in a vacuum at 60° C. The dyestuff obtained dyes cotton by the methods described in Example 2 greenish blue shade.

EXAMPLE 4

5.0 parts of 1-amino-4-(4′-methylamino-anilino)-anthraquinone-2,2′-disulphonic acid are dissolved in 150 parts of water and acylated with 2.2 parts of 2-(β-methoxyethoxy)-4,6-difluorotriazine at 20° C. and pH 5 to 6. The dyestuff of the formula

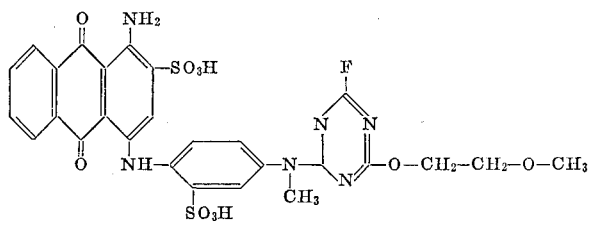

is precipitated in form of its sodium salt by the slow addition of sodium chloride, it is filtered off with suction, washed with a 25 percent sodium chloride solution and dried in a vacuum at 60° C. The dyestuff dyes cotton greenish blue shade by the methods given in Example 2.

EXAMPLE 5

5.2 parts of 1-amino-4-(4'-methylamino-methyl-anilino)-anthraquinone-2,2'-disulphonic acid are dissolved in 100 parts of water and acylated at 25° C. and a pH of 7 to 8 with 2.5 parts of 2-anilino-4,6-difluoro-triazine which have been dissolved in 15 parts of acetone. The dyestuff of the formula

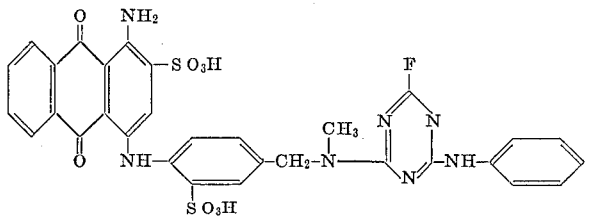

is precipitated in form of its sodium salt by the slow addition of sodium chloride, it is filtered off with suction, washed with a 5 percent sodium chloride solution and dried. The dyestuff dyes cotton clear blue shades fast to wt. processing.

Similar blue dyestuffs are obtained if the amino-anthraquinone compounds and the difluoro-triazine compounds of the following table are reacted by the method described in Example 5.

| Amino-anthraquinone compound | Difluoro-triazine compound |
| --- | --- |
| 1-amino-4-(4'-methylamino-methyl-anilino)-anthraquinone-2,2'-disulphonic acid. | 2-o-toluidino-4,6-difluoro triazine. |
| Do. | 2-(N-methyl-N-phenyl-amino)-4,6-difluoro-triazine. |
| Do. | 2-n-butylamino-4,6-difluoro-triazine. |
| Do. | 2-benzylamino-4,6-difluoro-triazine. |
| 1-amino-4-(3'-amino-methylanilino)-anthraquinone-2,2'-disulphonic acid. | 2-anilino-4,6-difluoro triazine. |
| Do. | 2-β-methoxy-ethoxy-4,6-difluoro triazine. |
| 1-amino-4-(3'-methylamino-methyl-anilino)-anthraquinone-2,6'-disulphonic acid. | 2-(N-methyl-N-phenyl-amino)-4,6-difluoro-triazine. |
| 1-amino-4-(3'-methylamino-methyl-4'-methyl-anilino)-anthraquinone-2,6'-disulphonic acid. | 2-phenyl-4,6-difluoro-triazine. |
| 1-amino-4-(3'-aminomethyl-4'-methoxy-anilino)-anthraquinone-2,6'-disulphonic acid. | 2-anilino-4,6-difluoro-triazine. |
| 1-amino-4-(3'-methylamino-methyl-4'-methoxy-anilino)-anthraquinone-2,6'-disulphonic acid. | Do. |
| 1-amino-4-(x'-aminomethyl-2'-methoxy-anilino)-anthraquinone-2,6'-disulphonic acid. | Do. |
| 1-amino-4-(3'-aminomethyl-2',6'-dimethyl-anilino)-anthraquinone-2,5'-disulphonic acid. | 2-methoxy-4,6-difluoro-triazine. |
| Do. | 2-anilino-4,6-difluoro-triazine. |
| 1-amino-4-(3'-methyl-amino-methyl-2',6'-dimethyl-anilino)-anthraquinone-2,5'-disulphonic acid. | Do. |
| 1-amino-4-(3'-aminomethyl-2',4'-6'-trimethyl-anilino)-anthraquinone-2,5'-disulphonic acid. | 2-(β-methoxy-ethoxy)-4,6-difluoro-triazine. |
| 1-amino-4-(4'-amino-anilino)-anthrachinon-2,3'-disulphonic acid. | 2-anilino-4,6-difluoro-triazine. |
| Do. | 2-diethylamino-4,6-difluoro-triazine. |

EXAMPLE 6

5.0 parts of 1 - amino - 4-(3'-amino-2'-metthyl-anilino)- 2,5'-disulphonic acid are dissolved in 80 parts of water and acylated with 2.3 parts of 2-anilino-4,6-difluoro-triazine at 20° C. and pH 6.5 to 7.5 with the addition of 2 parts of chlorobenzene. After about 5 hours there is added once more 1 part of 2 - anilino - 4,6 - difluoro-triazine to complete the reaction. When only small parts of the dyestuff of the formula

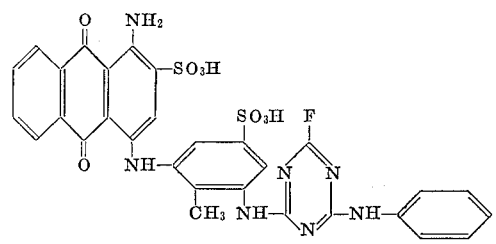

is precipitated in form of its sodium salt by the slow addition of sodium chloride, it is filtered off with suction, washed with a 15 percent sodium chloride soltuion and dried in a vacuum at 50 to 60° C. The dyestuff obtained dyes cotton clear blue shades by the methods given in Example 2.

What is claimed is:

1. An anthraquinone reactive dyestuff having the formula

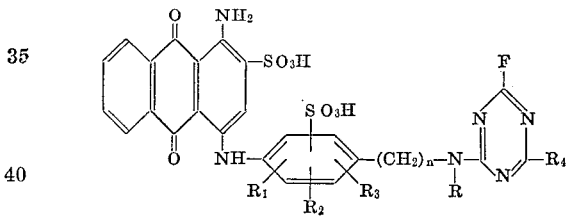

wherein $R_1$, $R_2$ and $R_3$ represent independently of one another hydrogen or lower alkyl, lower alkoxy, chlorine or bromine substituents;

$n$ stands for the number 0, 1 or 2;

R denotes hydrogen or lower alkyl;

F stands for a fluorine substituent; and $R_4$ stands for amino; lower alkylamino; dilower alkylamino; hydroxy lower alkylamino; di-(hydroxy lower alkyl)-amino; phenylamino; phenylamino substituted by a member selected from the class consisting of sulfo, chloro, methyl and nitro; benzylamino; hydrazino; benzyloxy; lower alkoxy; lower alkoxy substituted by lower alkoxy or hydroxy; phenoxy; sulfophenoxy; lower alkyl thio; lower alkyl thio substituted by hydroxy; phenylthio; phenylthio substituted by a member selected from the class consisting of chloro and sulfo; lower alkyl; phenyl; or phenyl substituted by a member selected from the class consisting of chloro, methyl, nitro and sulfo.

2. An anthraquinone reactive dyestuff having the formula

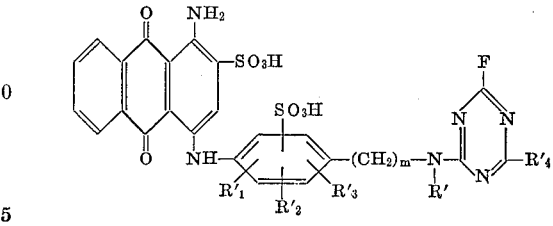

wherein

R'$_1$ represents hydrogen, lower alkyl or lower alkoxy;
R'$_2$ denotes hydrogen, lower alkyl, bromine or chlorine;
R'$_3$ stands for hydrogen or lower alkyl;
$m$ is the number 1 or 2;
R' denotes hydrogen or —CH$_3$;
F stands for a fluorine substituent; and
R'$_4$ stands for lower alkylamino having 1 to 4 carbon atoms, lower alkoxy substituted lower alkoxy, lower alkoxy, phenylamino, sulfo phenylamino or benzylamino, (wherein the lower alkoxy residues have 1–3 carbon atoms).

3. An anthraquinone reactive dyestuff having the formula

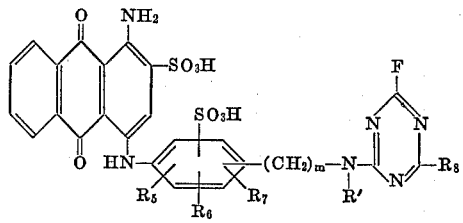

in which R$_5$ and R$_6$ represent hydrogen or lower alkyl, R$_7$ denotes hydrogen or lower alkoxy, $m$ is the number 0 or 1, R' represents hydrogen or —CH$_3$, F stands for a fluorine substituent, and R$_8$ represents phenyl, phenylamino, lower alkylphenylamino, sulphophenylamino, lower alkylamino, N-lower alkyl phenylamino, benzylamino, lower alkoxy or lower alkoxy substituted lower alkoxy.

4. The dyestuff of claim 1 having the formula

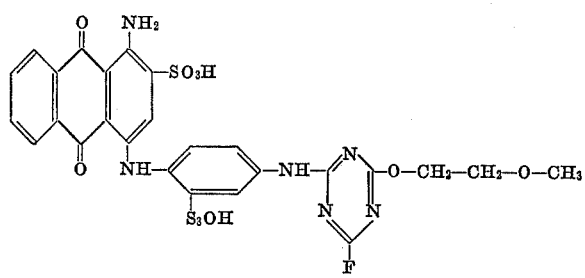

5. The dyestuff of claim 1 having the formula

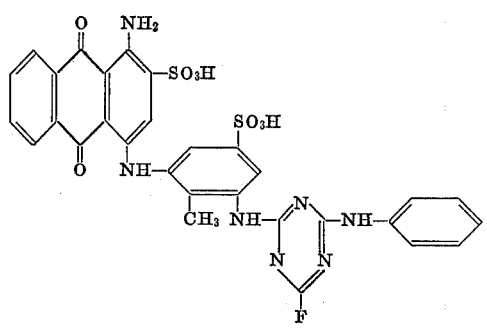

6. The dyestuff of claim 1 having the formula

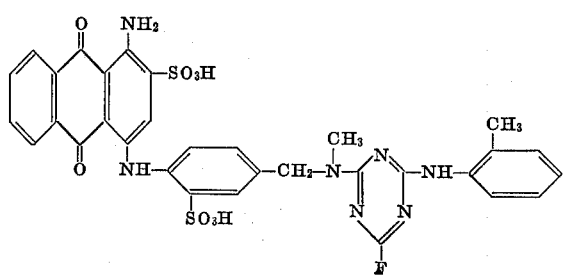

7. The dyestuff of claim 1 having the formula

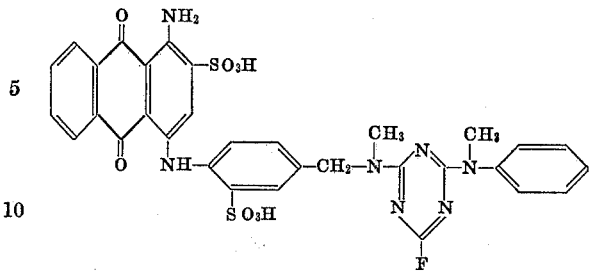

8. The dyestuff of claim 1 having the formula

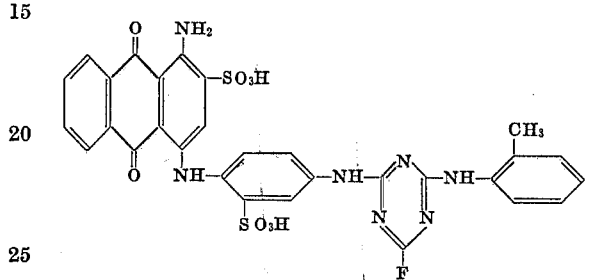

9. The dyestuff of claim 1 having the formula

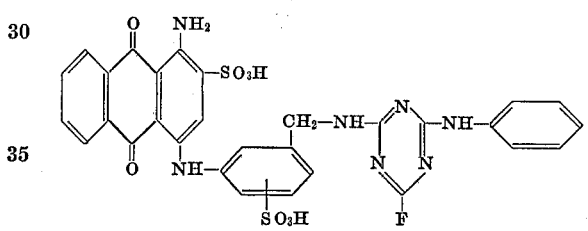

10. The dyestuff of claim 1 having the formula

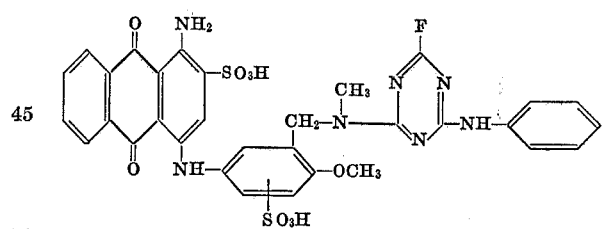

11. The dyestuff of claim 1 having the formula

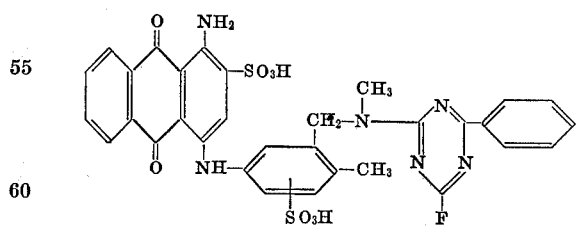

12. The dyestuff of claim 1 having the formula

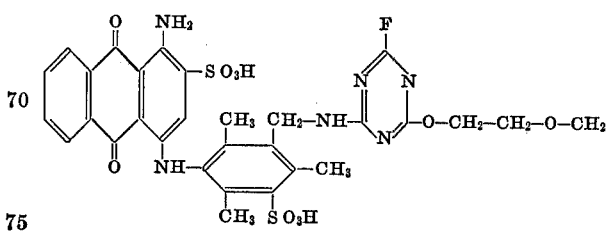

13. The dyestuff of claim 1 having the formula
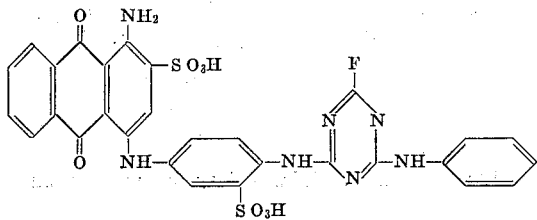
References Cited
UNITED STATES PATENTS
| 2,889,323 | 6/1959 | Heslop | 260—249 |
| 3,065,191 | 11/1962 | Heslop et al. | 260—249X |
| 3,251,844 | 5/1966 | Singer et al. | 260—249X |
| 3,415,825 | 12/1968 | Buehler et al. | 260—249 |
FOREIGN PATENTS
| 1,323,029 | 2/1963 | France | 260—249 |
HENRY R. JILES, Primary Examiner
J. M. FORD, Assistant Examiner
U.S. Cl. X.R.
8—39

UNITED STATES PATENT OFFICE
CERTIFICATE OF CORRECTION

Patent No. 3,558,621  Dated January 26, 1971

Inventor(s) Hans-Samuel Bien, et al.

It is certified that error appears in the above-identified patent and that said Letters Patent are hereby corrected as shown below:

| COLUMN | LINE | ERROR |
|---|---|---|
| 1 | 41 | "via" should be ---via--- |
| 2 | 11 | "( -bisoxethylamino)" should be ---( -bis-oxethylamino)--- |
| 2 | Form. V | 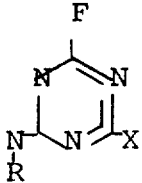 should be 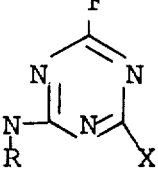 |
| 4 | 16 | "40 to 150°." should be ---40 to 150 |
| 4 | 55 | "carbonate.," should be ---carbonate |
| 4, | 70 | "results were obtained" should be ---results are obtained--- |
| 5 | 1 | "inter alia should be ---inter alia |

UNITED STATES PATENT OFFICE
CERTIFICATE OF CORRECTION

Patent No. 3,558,621      Dated January 26, 1971

Inventor(s) Hans-Samuel Bien et al.

It is certified that error appears in the above-identified patent and that said Letters Patent are hereby corrected as shown below:

| COLUMN | LINE | ERROR |
|---|---|---|
| 6 | 48 | "dyestuffs" should be ---dyestuff-- |
| 7 | Form 1 | " 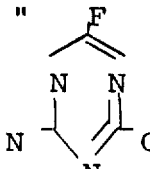 " should be --- 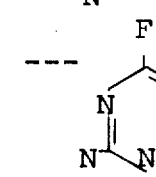 --- |
| 6 | 55-60 | " 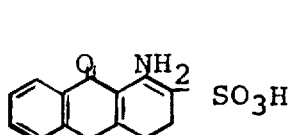 " should be --- 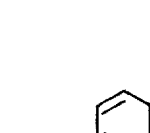 --- |

UNITED STATES PATENT OFFICE
CERTIFICATE OF CORRECTION

Patent No. 3,558,621  Dated January 26, 1971

Inventor(s) Hans-Samuel Bien, et al.

It is certified that error appears in the above-identified patent and that said Letters Patent are hereby corrected as shown below:

| COLUMN | LINE | ERROR |
|---|---|---|
| 7 | 2nd form. | " 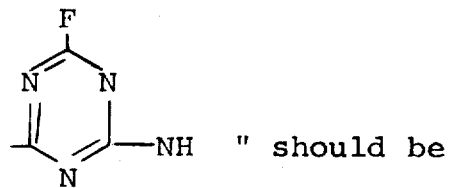 " should be --- 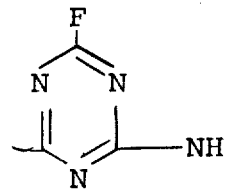 ---. |
| 7 | 74 | "anthrachinon" should be ---anthraquinone---. |
| 8 | 2 | "metthyl" should be ---methyl---. |
| 8 | 25 | "soltuion" should be ---solution--- |
| 9 | 6 | "number 1 or 2" should be ---number 1 or 2---. |

UNITED STATES PATENT OFFICE
CERTIFICATE OF CORRECTION

Patent No. 3,558,621          Dated January 26, 1971

Inventor(s) Hans-Samuel Bien, et al.

It is certified that error appears in the above-identified patent and that said Letters Patent are hereby corrected as shown below:

| COLUMN | LINE | ERROR |
|---|---|---|
| 9 | 2nd Form. | " NH—⟨⟩—NH should be $S_3OH$ |
| | | NH—⟨⟩—NH --- $SO_3H$ |
| 9 | Claim 5, line 1 | "1" should be ---3--- |
| 10 | Claim 9, line 1 | "1" should be ---3--- |
| 10 | Claim 10, line 1 | "1" should be ---3--- |
| 10 | Claim 11, line 1 | "1" should be ---3--- |
| 10 | Sixth form. |  " |

UNITED STATES PATENT OFFICE
CERTIFICATE OF CORRECTION

Patent No. 3,558,621   Dated January 26, 1971

Inventor(s) Hans-Samuel Bien et al.

It is certified that error appears in the above-identified patent and that said Letters Patent are hereby corrected as shown below:

| COLUMN | LINE | ERROR |
|---|---|---|

SHOULD BE

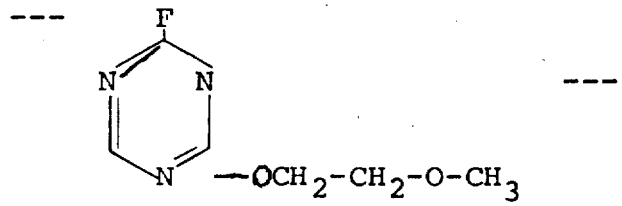

10, Claim 12, line 1   delete "of Claim 1"

9   3rd form   "  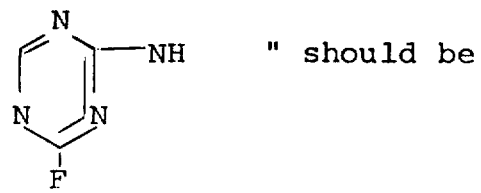   " should be

--- 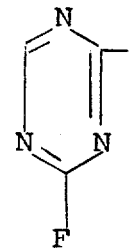   ---.

UNITED STATES PATENT OFFICE
CERTIFICATE OF CORRECTION

Patent No. 3,558,621  Dated January 26, 1971

Inventor(s) Hans-Samuel Bien, et al.

It is certified that error appears in the above-identified patent and that said Letters Patent are hereby corrected as shown below:

| COLUMN | LINE | ERROR |
|---|---|---|
| 11 | 1st form. | " 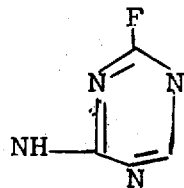 " should be 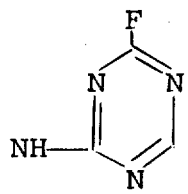 ---. |

Signed and sealed this 13th day of June 1972.

(SEAL)
Attest:

EDWARD M. FLETCHER, JR.
Attesting Officer

ROBERT GOTTSCHALK
Commissioner of Patents